United States Patent [19]

Krauss et al.

[11] Patent Number: 4,871,262
[45] Date of Patent: Oct. 3, 1989

[54] COSMETIC DISPENSING SYSTEM

[75] Inventors: Andre Krauss, Brooklyn, N.Y.; Harry Martin, Boxford; Richard Pszenny, Gloucester, both of Mass.

[73] Assignee: Hydrocosmetics, Inc., New York, N.Y.

[21] Appl. No.: 152,109

[22] Filed: Feb. 4, 1988

[51] Int. Cl.$^4$ .................. B01F 15/02; B01F 15/04
[52] U.S. Cl. ................... 366/160; 222/135; 366/231; 366/605
[58] Field of Search ............ 366/160, 161, 162, 152, 366/605, 208, 213, 214, 218, 220, 221, 230, 231; 222/135

[56] References Cited

U.S. PATENT DOCUMENTS

| | | |
|---|---|---|
| 1,397,520 | 11/1921 | Howe . |
| 2,832,510 | 4/1958 | Hill . |
| 2,848,019 | 8/1958 | Corbin . |
| 2,923,438 | 2/1960 | Logan ................................ 366/605 |
| 4,054,270 | 10/1977 | Gugger .............................. 366/143 |
| 4,258,759 | 3/1981 | Achen . |
| 4,316,490 | 2/1982 | Meyer . |

Primary Examiner—Robert W. Jenkins
Attorney, Agent, or Firm—Gottlieb, Rackman & Reisman

[57] ABSTRACT

A cosmetic dispensing system for blending selected cosmetic additives into a cosmetic base is provided. The system includes a plurality of storage containers for storing the additives; a pumping system for transferring selected additives to a cosmetic base, and a mixing system for blending the cosmetic base with the additives.

53 Claims, 8 Drawing Sheets

COSMETIC DISPENSING SYSTEM

BACKGROUND OF THE INVENTION

This invention relates to an automatic cosmetic dispensing system, and more particularly, to a system which enables the preparation of a large variety of skin cosmetics and is suitable for use at a retail establishment.

Skin cosmetics include facial creams, deodorants, suntan lotions and makeup formulations. Most skin cosmetics are sold on drugstore or supermarket shelves and are usually just suitable for a single limited type of skin condition such as, for example, normal skin, oily skin or dry skin. Although these "over the counter" cosmetics are somewhat satisfactory, if the user has a particular skin condition, the cosmetic product which the user is forced to purchase may not be the most appropriate.

Although some cosmetic manufacturers have come out with cosmetic products for more than these above-named skin conditions, most drugstores and supermarkets are unable to display and sell such products because of their limited shelf space. Retail stores usually choose to sell cosmetic products from a large variety of manufacturers, rather than selling cosmetic products for a variety of skin conditions from only a single or a few manufacturers. As a result, the retail customer is forced to choose from only a limited selection of cosmetic products (oily, normal or dry).

Accordingly, it is desirable to provide a system which enables the preparation of a large variety of skin cosmetics that is suitable for use at the retail level.

SUMMARY OF THE INVENTION

Generally speaking, in accordance with the invention, a cosmetic dispensing system which enables the preparation of a large variety of skin cosmetics is provided.

The system includes a plurality of storage containers for storing the additives, a pumping system for transferring selected additives to a cosmetic base, and a mixing system for blending the base with the additives.

In particular, the system or machine is suitable for use at a retail establishment and includes three basic sections or compartments. The first compartment houses various cosmetic additives used in forming a cosmetic cream in a plurality of bottles. The bottles are hidden by a pair of removable panels, which allow access to the bottles in order to replenish the cosmetic additive. The panels are provided with windows which enable the operator of the machine to check the level of each additive in order to replace it when necessary.

The second compartment of the machine includes a rotating turntable on which a jar containing a cream base rests. The jar may be rotated from a first position where it is positioned underneath a dispensing port to a second position where a stirrer may be inserted. The dispensing port includes a plurality of exit tubes which correspond to the number of additive bottles. Each of the exit tubes is connected to a corresponding additive bottle by an individual connecting tube extending through the machine.

The third compartment includes a number of measuring switches or dials which correspond to the number of additive containers. In operation of the machine, the measuring switches can be set to various positions, each position representing a different measure of each of the additive used in the blend. In other words, a first position represents no additive, and subsequent positions represent various quantities of the additive. Once all the switches are set to desired positions, the jar is positioned below the dispensing port and a "dispense" button is pressed, which causes the selected quantities of each of the additives to be simultaneously dispensed through the various exit tubes and into the jar or container. This is achieved by activating suitable pumping mechanisms, which cause transfer of the selected additives from the additive bottles, through the tubings and into the cream base jar.

Once additive dispensing is completed, a "rotate" button is pressed, which causes the turntable of the second compartment to rotate so that the jar is located underneath the mixing rod. Then, after the mixing rod is placed into the jar, a "blend" button is pressed, which causes the jar to rotate for a selected time period so that the additives and base cream are thoroughly mixed. Once mixing is completed, the jar is removed, sealed and then given to the ultimate consumer.

Accordingly, it is an object of the invention to provide a cosmetic dispensing system which enables the preparation of a variety of skin cosmetics.

It is another object of the invention to provide a cosmetic dispensing system in which volumetric control of the amount of cosmetic additives is obtained.

Still another object of the invention is to provide a cosmetic dispensing system which enables the pre-selection of cosmetic additives.

Yet another object of the invention is to provide a cosmetic dispensing system that includes a mechanism for mixing the cosmetic additives with the base cream after dispensing takes place.

Still a further object of the invention is to provide a cosmetic dispensing system which enables the preparation of a cosmetic of a particular desired utility.

Still other objects and advantages of the invention will in part be obvious and will in part be apparent from the following description.

The invention accordingly comprises the features of construction, combination of elements, and an arrangement of parts which will be exemplified in the construction hereinafter set forth, and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENT

Figure 1:
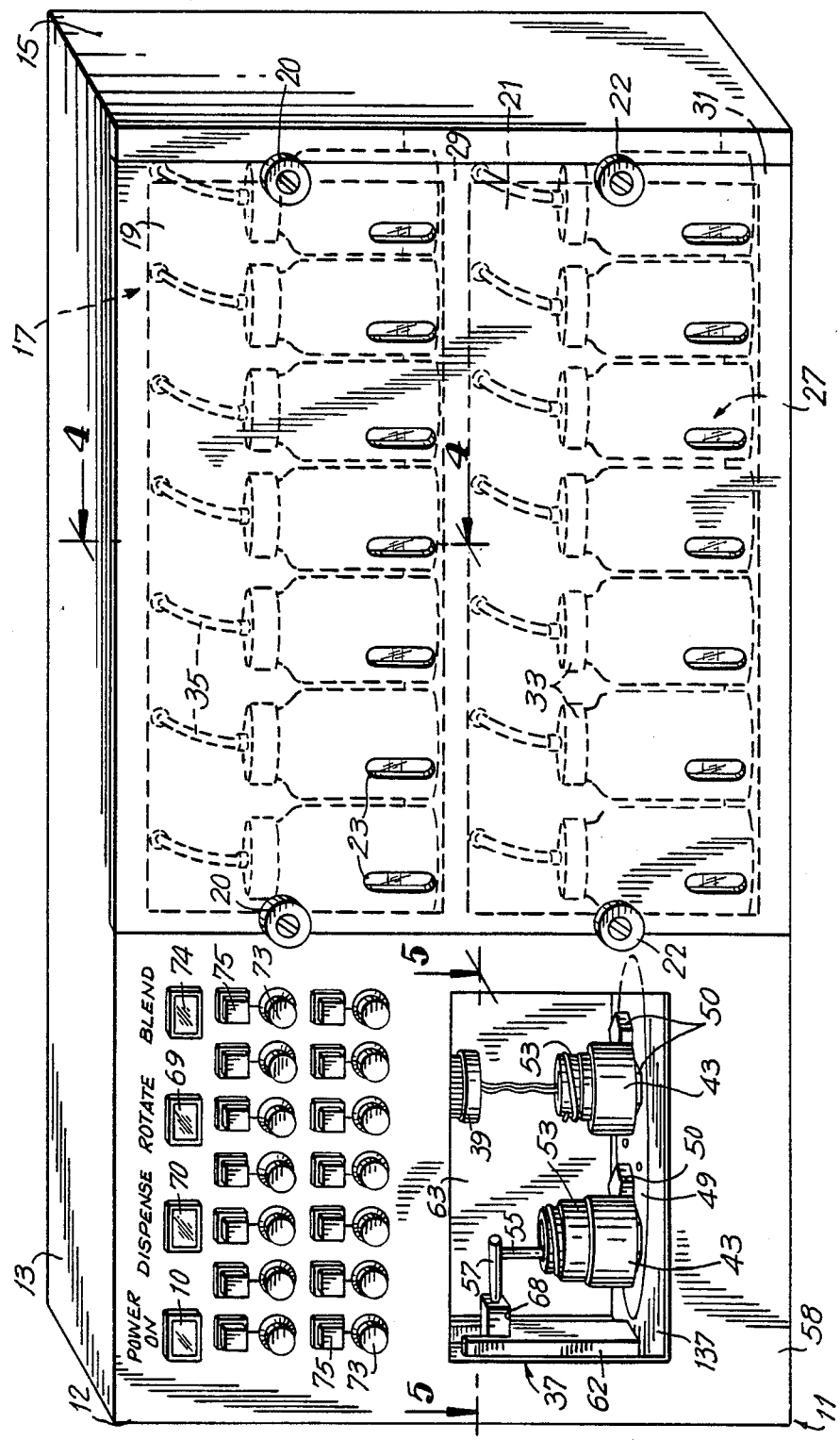
FIG. 1 is a perspective view of a cosmetic dispensing system, with same of the internal components shown, in accordance with the invention.

Referring first to FIG. 1, a cosmetic dispensing system or apparatus 11 in accordance with the invention is illustrated. Apparatus 11 is defined by a rectangular box 12 having a top panel 13, side panels 15 and a bottom panel and back panel (not shown). Apparatus 11 includes, on the right in FIG. 1, a storage compartment 17, which houses a plurality of bottles 27 containing various liquid cosmetic additives, and a front left panel 58. Storage compartment 17 includes an upper shelf 29 and a lower shelf 31 on which bottles 27 rest. Compartment 17 is covered by a first upper panel 19 held on by two thumbscrews 20, and a second lower panel 21 held on by two thumbscrews 22. Upper panel 19 includes a series of upper windows 23 and lower panel 21 includes a series of lower windows 25. Windows 23 and 25 enable the operator of apparatus 11 to observe the level of cosmetic fluid contained in each of bottles 27.

Figure 3:
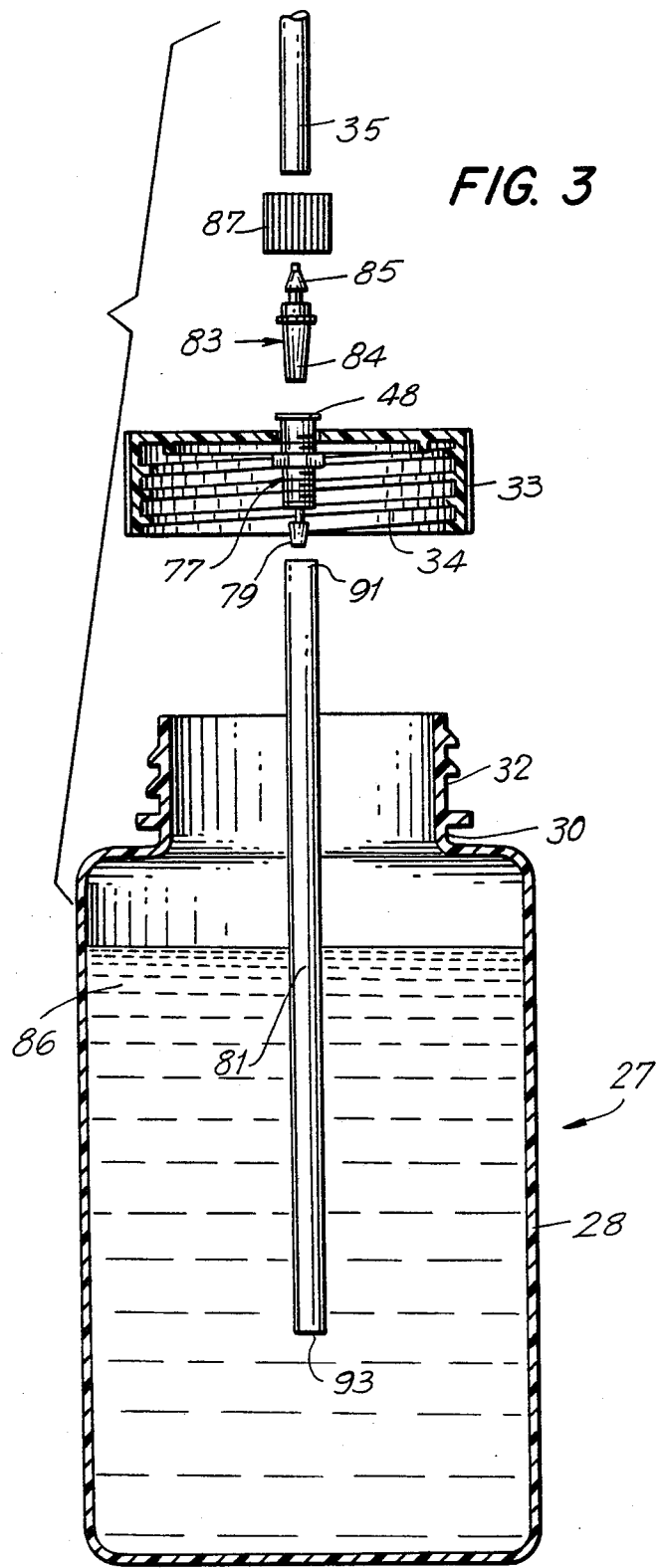
FIG. 3 is an exploded cross-sectional view of one of the bottles containing cosmetic additive which are illustrated in FIG. 1.
Figure 4:
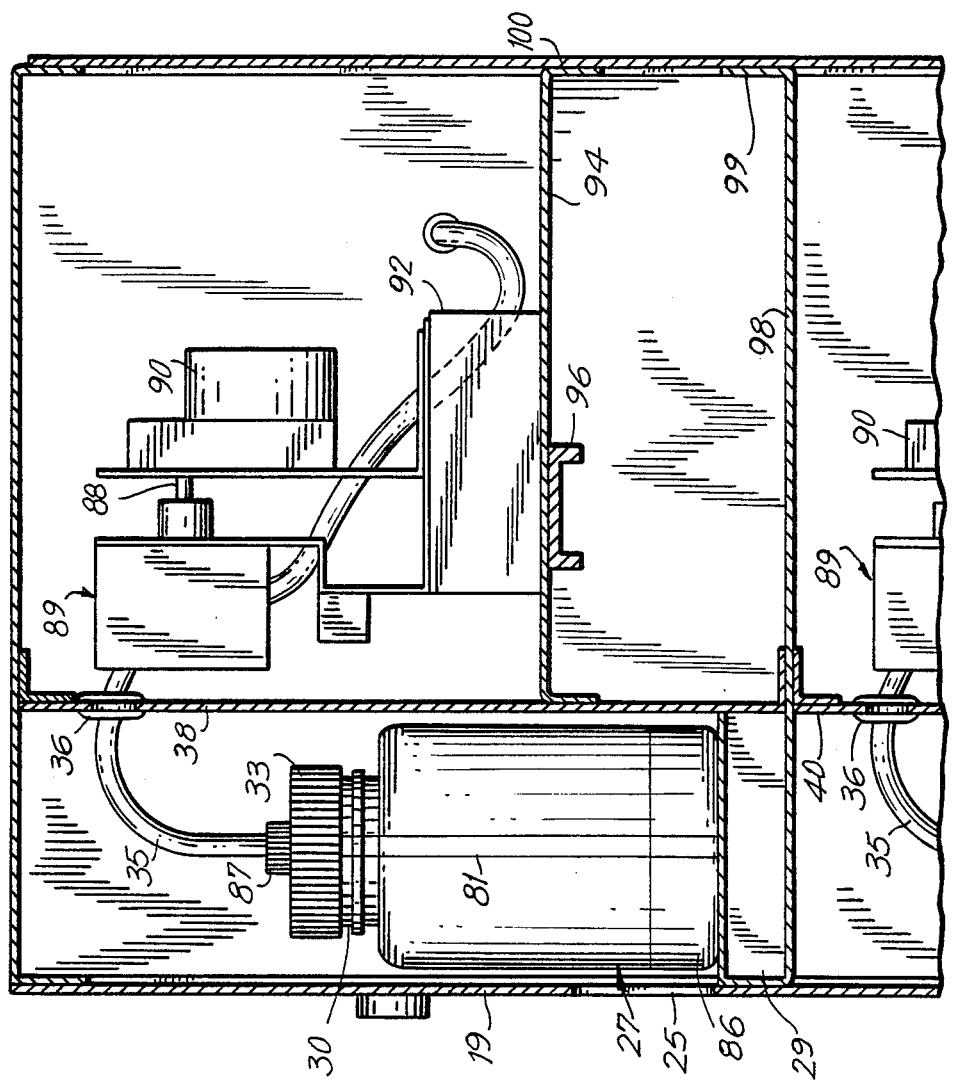
FIG. 4 is a cross-sectional view taken along line 4—4 of FIG. 1 and illustrating the bottle shown in FIG. 3 connected to the pumping mechanism of the invention.

Referring now to FIGS. 3 and 4, as well as to FIG. 1, bottles 27 stored in compartment 17 of apparatus 11 are further described. Each of bottles 27 include a container portion 28, a neck 30 and a cap 33 suitable for being tightened around neck 30. Neck 30 includes an externally threaded surface 32. Cap 33 includes an internally threaded surface 34, the threads of which are suitable for engaging the threads of externally threaded surface 32 to permit cap 33 to be screwed on to neck 30. A supply tube 35 is connected to cap 33 and extends upwardly therefrom (as described below) to carry away the selected cosmetic additive liquid within bottle 27. Tube 35 is made from FDA approved surgical grade silicon rubber tubing.

The connection of supply tube 35 to bottle cap 33 is shown in FIG. 3, as well as FIG. 4. Bottle cap 33 includes a female fitting 77 extending axially therethrough. Fitting 77 is provided with a nipple 79 at one end thereof and a receptacle 78 at the other end. Nipple 79 is suitable for engaging a tube 81 which extends longitudinally through the interior of container 28 of bottle 27 to substantially the bottom thereof. Tube 81 includes a first upper end 91 and a second lower end 93 which contacts cosmetic additive 86 stored in bottle 27.

A male fitting 83 is provided and includes a nipple 85 at one end thereof, and a conically shaped projection 84 at the other end. An annular coupling 87 is also provided and is suitable for being retained about fitting 83, as described in more detail below.

In assembly, nipple 79 of fitting 77 is plugged into upper end 91 of tube 81. Then, cap 33 is screwed on to neck 30 in a conventional manner and tightened. Once cap 33 is tightened, male fitting 83 is connected to female fitting 77 by plugging projection 84 into a mating conically shaped opening in receptacle 78. Then, the end of supply tube 35 is coupled to nipple 85 of male fitting 83, which effectively connects supply tube 35 to bottle 27, as shown in FIG. 4. This connection is reinforced by tightening coupling 87 about the external surface of female fitting 77. As a result, a continuous pathway is provided from the interior of bottle 27 through tube 81 and into tube 35, so that cosmetic additive liquid retained in bottle 27, upon the urging of an applied suction force, as described hereinbelow, may be transferred out of bottle 27.

Turning specifically now to FIG. 4, the mechanism for transferring liquid cosmetic additive 86 from the interior of bottle 27 and through supply tube 35 is shown. Each tube 35 passes through a grommet 36 in a first upper rear wall 38 and a second lower rear wall 40 of compartment 17. Tube 17 then enters a peristaltic pump generally designated at 89 of the type well known in the art. Each pump 89 is mounted on a base 92 which is affixed to either an upper support shelf 94 or a lower support shelf (not shown). Each support shelf is supported by a respective channel 96 fixedly supported horizontally within rectangular box 12. A horizontal extension 98 of the sheet metal component used to fabricate upper shelf 29 is bent to form a vertical planar portion 99 contacting a rear panel 100 of box 12 and then is again bent to form upper support shelf 94. A similar structure (not shown) exists extending from lower shelf 36.

Pump 89 is activated by a motor 90, which is coupled thereto by a shaft 88. The overall pump system may be chosen from Part No. 900-0532, manufactured by Barnant Co. of Barrington, Ill., in which the output shaft thereof rotates at 10 rpm. Under computer control, or under control of the circuit of FIG. 9, as described in more detail below, when motor 90 is activated, pump 89 selectively urges a pre-determined amount of cosmetic additive 86 through tube 35. Each of bottles 27 is associated with a respective peristaltic pumping mechanism in order that the additive contained therein may be selectively dispensed.

Figure 5:
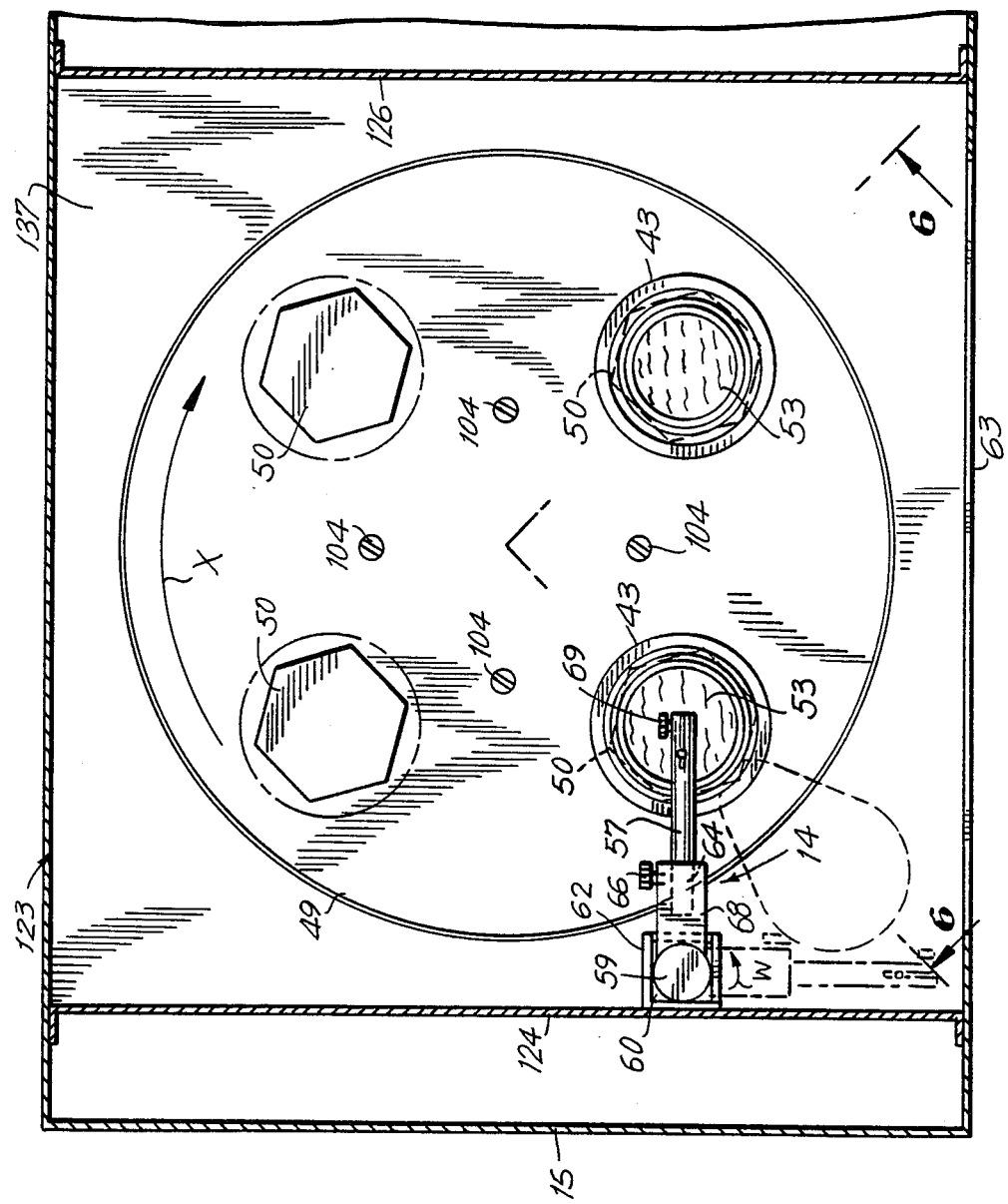
FIG. 5 is a cross-sectional view taken along line 5—5 of FIG. 1 and illustrating the turntable of the invention.
Figure 6:
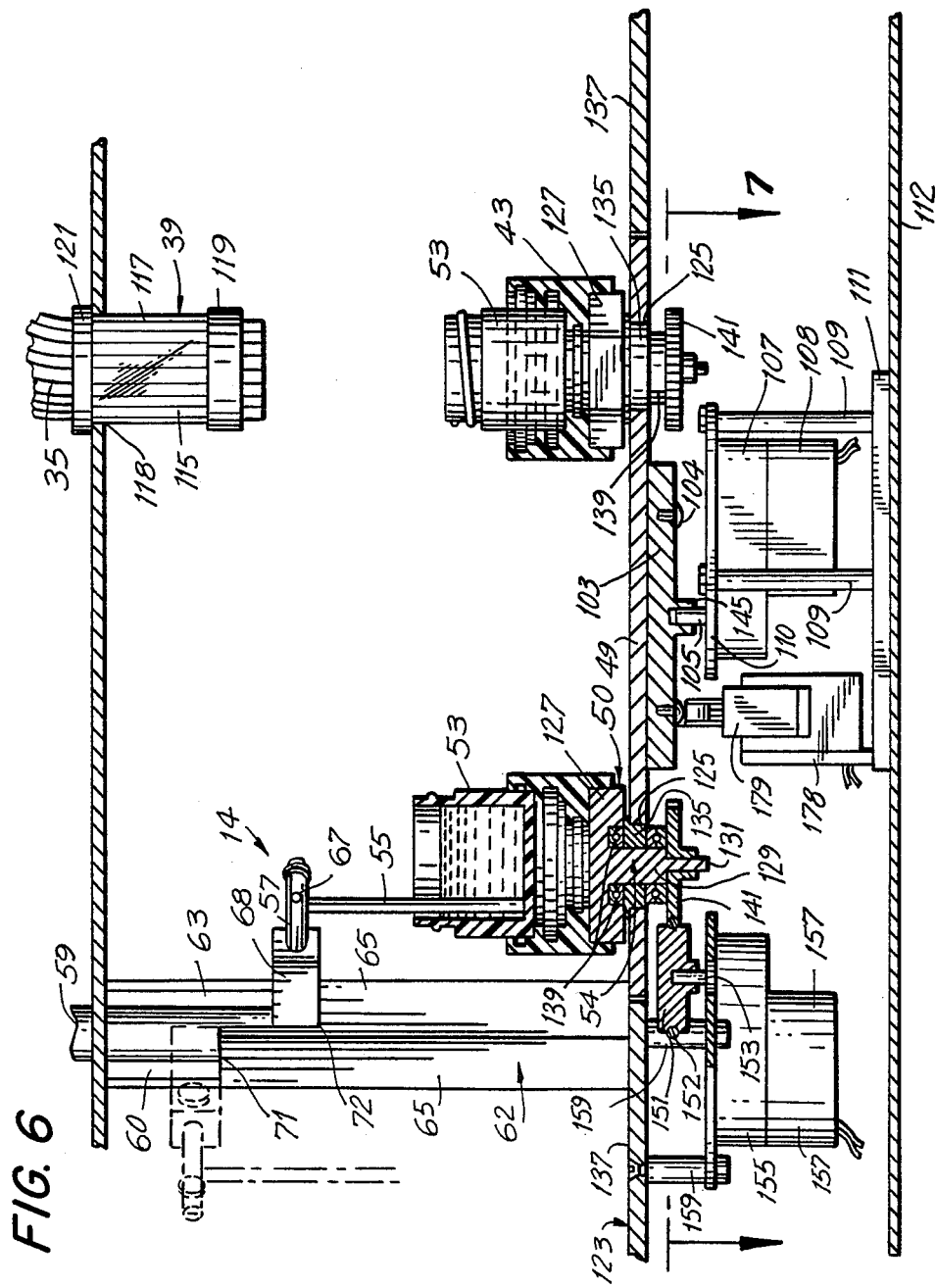
FIG. 6 is a cross-sectional view taken along line 6—6 of FIG. 5 and illustrating the dispensing and mixing portions of the invention.
Figure 7:
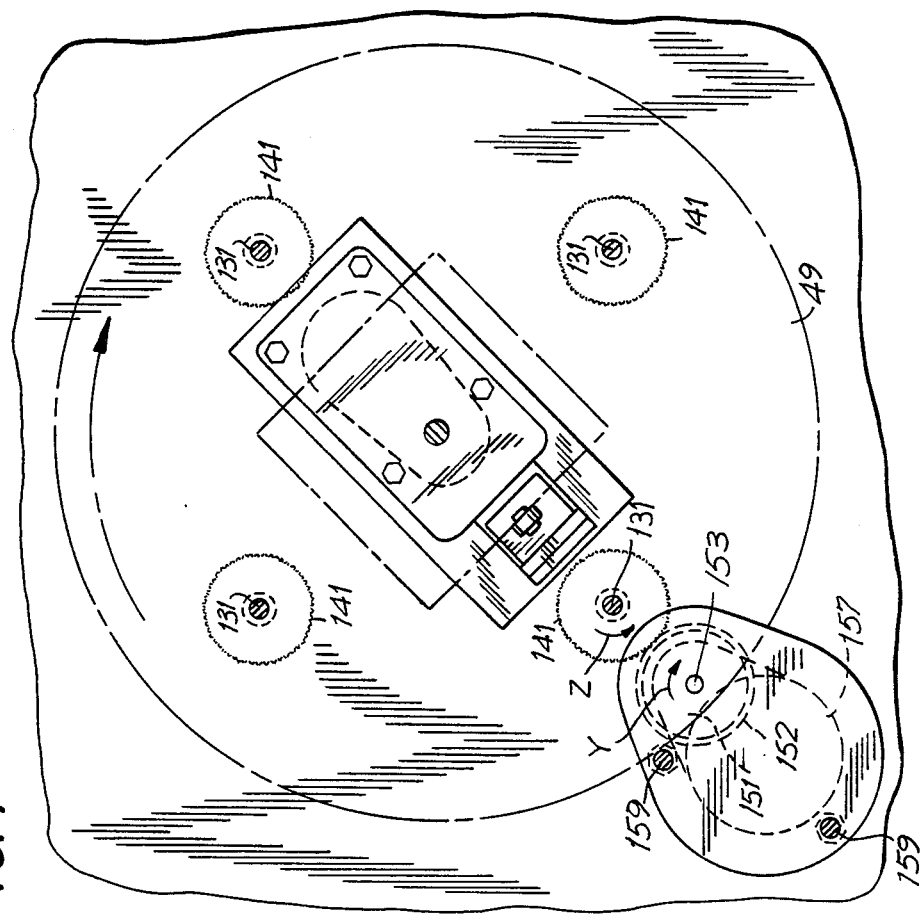
FIG. 7 is a cross-sectional view taken along 7—7 of FIG. 6.

Referring once again to FIG. 1, as well as to FIGS. 5–7, the blending compartment 37 of cosmetic dispensing system 11 is now described. Compartment 37 is recessed in the lower portion of front left panel 58 and is visible to the operator through a rectangular window or opening 63. Compartment 37 is in part defined by ceiling 113, which includes a circular opening 118 from which a dispensing unit generally designated at 39 depends. Dispensing unit 39 extends downwardly from ceiling 113 and is supported therefrom by means of a flange 121 having a diameter slighter larger than the diameter of opening 118 and which has a lower surface in contact with the upper surface of ceiling 113.

Dispensing unit 39 includes a clear plastic cylinder 117 which depends from flange 121 and passes through opening 118. Unit 39 is provided with a dispensing head 119 at its lower end and houses a bundle of vertically extending tubes 115, which extend slightly below dispensing head 115. Alternatively, one end of a dual ended nozzle (not shown), such a Part No. J-6365-11 manufactured by Cole-Parmer Corporation (1987–1988 catalog, pages 566–567), may be inserted into each tube 115, with the free end serving as a dispensing nozzle. In this case, the nozzles may be held in position by passing through holes in a circular place (not shown) retained between the bottom of cylinder 117 and dispensing head 119.

Tubes 115 correspond in number to the number of bottles 27 retained in storage compartment 17, described above, and as shown in FIG. 6, are coupled to the ends of supply tubes 35 by suitable liquid couplings, such as for example, female fitting 77 and mating male fitting 83 of the type used to couple tubes 35 to caps 33 of bottles 27 (FIG. 3). These fittings may be obtained from the above manufacturer as Part Nos. J-6359-52 and J-6359-07 and are held together by a coupling 87 (FIG.

3) available as Part No. J-6359-67. In this manner a continuous and separate pathway from each of bottles 27 to dispensing unit 39 is provided.

Blending compartment 37 is also defined by side walls 124 and 126 extending from ceiling 113 and a floor 123 extending between the bottom of side walls 124 and 126. Floor 123 includes a peripheral portion 137 and a turntable 49 received in a circular opening in peripheral portion 137, which rotates in a direction shown by arrow X of FIG. 5. With specific reference to FIG. 6, turntable 49 has four equiangularly spaced holes 125, all at the same radius from shaft 105 (discussed below), and four corresponding base members 50 rotatably mounted to holes 125. Each of base members 50 includes a top member 127 and a shaft generally designated as shaft 54 extending downwardly therefrom. Shaft 54 includes a first wider shaft portion 129 and second narrower shaft portion 131 extending from wider shaft portion 129. Each of narrower shaft portions 131 is fitted thereabout with a knurled wheel 141. Each of holes 125 is press fitted with a bronze bushing 135, which has a hole for receiving wider shaft portion 129 of base member 50. To enable wider shaft 129 to freely rotate, thrust bearings 139 are provided above and below bronze bushing 135.

The mechanism for rotating turntable 49 is now described. A disk member 103 is mounted on the bottom surface of turntable 49 coaxially therewith. Disk member 103 includes a downwardly extending central projection 145 which receives an output shaft 105 of a reduction drive 107 of a motor designated generally as 108. Motor 108 is held in place by a series of standoffs 109 to which a flange 110 of reduction drive 107 is bolted. Standoffs 109 are bolted to a base member 111, which is attached to a floor 112 within box 12. If motor 108 is activated, shaft 105 turns, thus causing turntable 49 to rotate in the direction of arrow X, for 90° as shown in FIG. 5. The rotation cycle of turntable 49 (90°) occurs in about 10 seconds and motor 108 is preferably Model A, Part No. 3002-003, of Hurst Manufacturing Corp. of Princeton, Ind., suitable geared down by reduction drive 107.

Referring now to FIGS. 6 and 7, the mechanism for rotating one of base members 50 is now described. After turntable 49 is rotated (90° in the direction of arrow X), one of knurled wheels 141 contacts a drive wheel 151, as illustrated in FIG. 7. Drive wheel 151 is provided with an O-ring 152 along the rim thereof in order to frictionally engage knurled wheels 141. Wheel 151 is rotatably supported by a shaft 153, which is coupled to a reduction drive 155 of a motor 157. Motor 157 is supported in the assembly by support arms 159 extending downwardly from peripheral portion 137 of floor 123. When motor 157 is activated (as described in more detail below), drive wheel 151 turns in the direction of arrow Y, which drives knurled wheel 141 in the direction indicated by arrow Z. Rotation of knurled wheel 141 causes the rotation of base 50. Alternatively, a gear mechanism may be provided for rotating base 50.

In order to prevent turntable 49 from rotating more than 90° during a single rotate cycle (in response to the activation of motor 108), disk member 103 is provided with four screw members 104, the heads of which extend somewhat below the lower surface of disk member 103. Each of screw members 104 are equiangularly spaced about disk member 103 at the same radius from shaft 105.

A mounting switch 179 is supported by a vertical bracket 178 mounted on base 111, as shown in FIG. 6. Simultaneously with the mating engagement of wheels 151 and 141, the head of corresponding screw 104 cams the plunger of micro switch 179. This causes an electrical circuit to motor 108 to be opened (as move fully described below with respect to FIG. 9), shutting down motor 108, and thereby stopping rotation of turntable 49. As a consequence of the electrical connections described with respect to FIG. 9, it is not possible for turntable 49 to rotate in response to the activation of motor 108 at the same time as base 50 rotates in response to the activation of motor 157.

When turntable 49 is not rotating, one of base members 50 is always positioned directly underneath dispensing unit 39 (position 1), as shown in FIGS. 1 and 6. To facilitate dispensing, a receptacle 43 is mounted over base 50. Receptacle 43 (which has a series of internal, annular steps for receiving jars at various diameters) receives a jar 53 containing a cosmetic base. By then activating the dispensing mechanism of the system so as to select the cosmetic additives desired, the additives may be dispensed through dispensing unit 39 and into jar 45.

After dispensing is completed, motor 108 is activated, which causes rotation of turntable 49 in the direction of arrow C for 90° to a position where knurled wheel 141 engages drive wheel 151 of motor 157 (position 2). Rotation of turntable 49 for more than 90° is prevented by the camming action of the head of screw 104 on micro switch 179, as described above.

Once wheels 141 and 151 have engaged, motor 157 may be activated in order to spin or rotate base 150. Motor 157 is preferably Model A, Part No. 3002-016, also manufactured by Hurst, in which the output shaft thereof rotates at 60 rpm. After engagement, jar 45 received in receptacle 51 is caused to rotate, which promotes mixing of the dispensed cosmetic additives with the cosmetic base. Mixing takes place for between about one minute and one minute, 20 seconds.

In order to further promote mixing of the cosmetic additives with the cosmetic base, a stirring mechanism generally designated at 14 in FIGS. 5 and 6 is provided for the system. As described herein, stirring mechanism 14 is mounted in a square tube 62 supported by and extending vertically from perimeter 137, adjacent the mixing area of compartment 37. Tube 62 comprises four side walls 65, which define a channel 60 extending longitudinally through tube 62. One of side walls 65, which faces turntable 49, is provided with a longitudinally extending opening 63 having a lower lip 72. A rod 59 is retained within and is vertically slideable through channel 60 of tube 62. A mounting block 68 extends radially from the mid portion of rod 59 and projects through opening 63, as shown in FIG. 6.

Mounting block 68 is provided with an arm 57 extending therefrom which is telescopingly received in a recess 64 extending along the length of block 68. Arm 57 may be slideably adjusted in recess 64 by appropriately tightening and loosening set screw 66. Adjacent the forward tip of arm 57 is a hole 67, suitable for receiving a mixing rod 55 therefrom. Mixing rod 55 is retained within hole 66 by a second set screw 69, as illustrated in FIG. 5.

Prior to mixing, as shown in phantom in FIGS. 5 and 6, rod 59 is lifted upwardly within channel 60 and mounting block 68 is rotated away from turntable 49 above a lip 71 of one of side walls 65 in order that mixing rod 55 does not hang above container 53. When mixing is desired, mixing rod 55 is positioned over jar 53 by appropriately mounting block 68 along lip 71 in the direction of arrow W, thus rotating rod 59. Rod 59 is then allowed to slide downwardly within channel 60 under the action of gravity, so that mounting block 68 rests on lip 72. As a result, mixing rod 55 is now positioned within jar 53, as shown in FIGS. 5 and 6. Motor 157 may now be activated, which causes rotation of jar 53, as described above. Due the presence of mixing rod 55 within jar 53, blending of the cosmetic additives and the cosmetic base is vastly improved.

Figure 8:
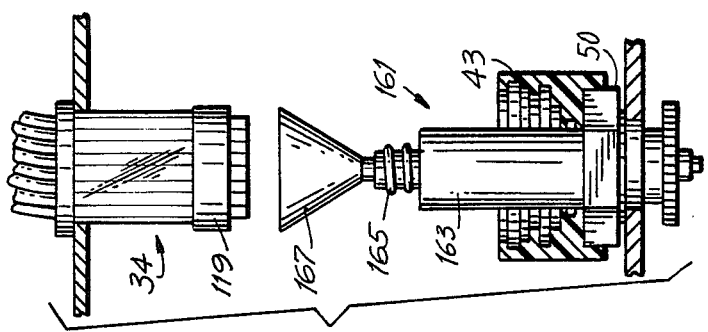
FIG. 8 is a second embodiment of the dispensing portion of the invention previously illustrated in FIG. 6.

Turning now to FIG. 8, an alternative means for receiving cosmetic additives dispensed from dispensing unit 34 into a cosmetic base is shown. Receptacle 43, mounted over base 50 as described above, now receives a container unit generally designated at 161. Container unit 161 includes a canister 163, a neck 165 and a removable funnel 167 received by neck 165. Once container unit 161 is appropriately positioned within receptacle 43, funnel 167 is positioned directly below dispensing head 119 of unit 34. When dispensing takes place, dispensed cosmetic additive falls within funnel 167 and is guided through neck 165 and into the interior of canister 163. After dispensing is completed, container unit 161 is removed from base 50 and funnel 167 is then removed from neck 165 for reuse with another canister. After rotating turntable 49 90° (as previously described), blending may be accomplished by simply rotating base 50 as described above, or by carefully positioning mixing rod 55 so that it extends through neck 163 and then rotating base 50.

Figure 2:
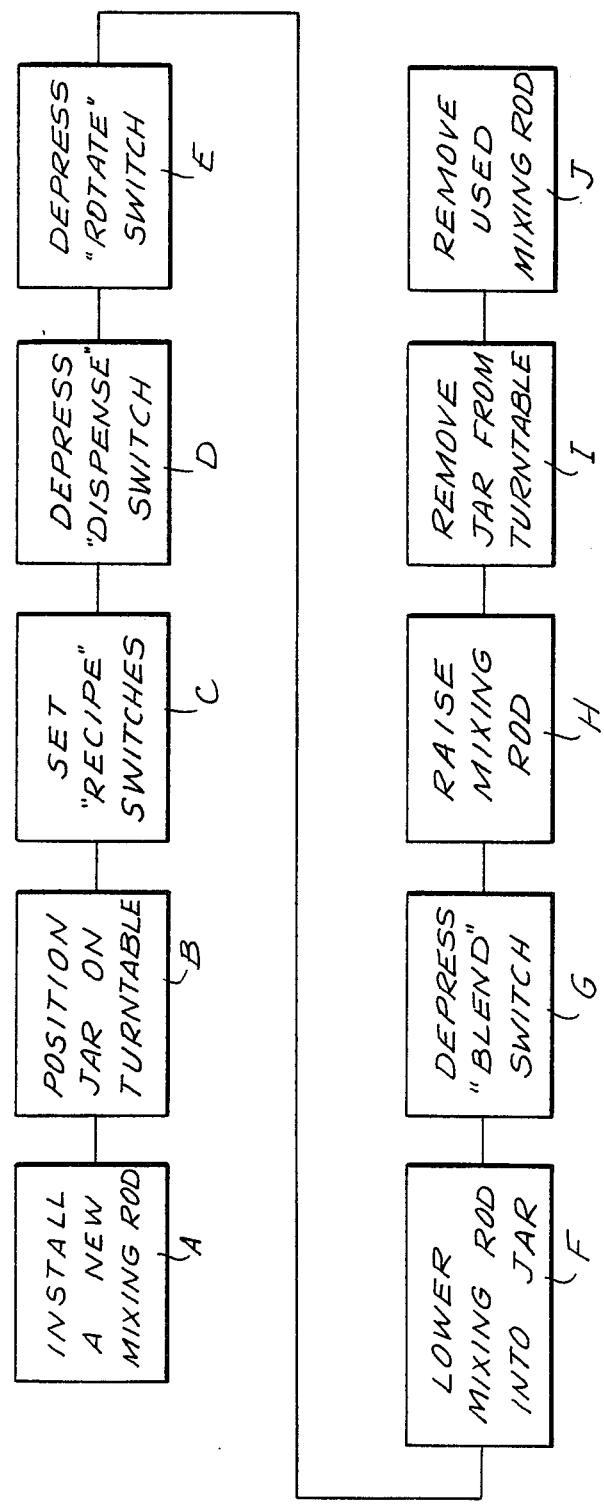
FIG. 2 is a flow diagram which illustrates operation of the cosmetic dispensing system sown in FIG. 1.

Turning now to FIGS. 1 and 2, the method for preparing the cosmetic composition in accordance with the invention, is now described. This is done by following the steps of FIG. 2:

A. Install A New Mixing Rod—Mixing rod 55 is attached to arm 57 by inserting one end of mixing rod 55 into hole 67 and then tightening screw 69.

B. Position Jar On Turntable—Receptacle 43 is mounted over base 50, which lies directly underneath dispensing unit 39, and jar 53 is received therein.

C. Set Recipe Switches—Referring specifically to FIG. 1, disposed along panel 58 above blending compartment 37 is a control area for operating dispensing system 11. The control area includes a series of measuring knobs 73, which correspond in number to the number of bottles 27 containing cosmetic additive. Measuring knobs 73 may be appropriately turned to either a 0 position, 1 position, 2 position or 3 position, depending on the amount of selected additive desired. If the 0 position is selected, no additive is chosen, and if the 1, 2 or 3 positions are selected, various increasing amounts of additive are dispensed. Moreover, if a particular measuring knob is turned to either the 1, 2 or 3 position, the corresponding display light 75 positioned directly above its respective knob 73 is then illuminated.

D. Depress Dispense Switch—Once all the measuring knobs are set (to either 0, 1, 2 or 3) and jar 53 is positioned under dispensing unit 39, dispense button 70 is pressed, which causes the selected additive to be simultaneously pumped from bottles 27, through supply tubes 35 and into jar 53.

E. Depress Rotate Switch—Once additive dispensing is completed, rotate switch 69 is pressed, which causes turntable 49 to rotate so that jar 53 is located underneath mixing rod 55.

F. Lower Mixing Rod Into Jar—Mixing rod 55 is positioned within jar 53, which now contains both cosmetic additives and cosmetic base. Particularly, mixing rod 55 is lowered by sliding mounting block 68 downwardly through opening 63 until block 63 rests against lower lip 72.

G. Depress Blend Switch—After mixing rod 55 is lowered into jar 53, blend switch 74 is pressed, which activates motor 157 and causes jar 53 to rotate for a predetermined period of time so that the additives and base cream are thoroughly mixed.

H. Raise Mixing Rod—Mixing rod 55 is removed from the interior of jar 53 by sliding block 68 upwardly through opening 63. Then, block 68 is pivoted away from the interior of compartment 37 along lip 74, as shown in phantom in FIG. 6. Mixing rod 55 may be detached from arm 57 by loosening set screw 69 if a different blend is to be prepared and purity is important. If the same blend is repeatedly produced, it is not essential to replace mixing rod 55.

I. Remove Jar From Turntable—Jar 53 is lifted away from receptacle 43 and then sealed by an appropriate cover (not shown) so that it may be sold or given to the ultimate consumer.

J. Remove Used Mixing Rod—(If desired)

Figure 9:
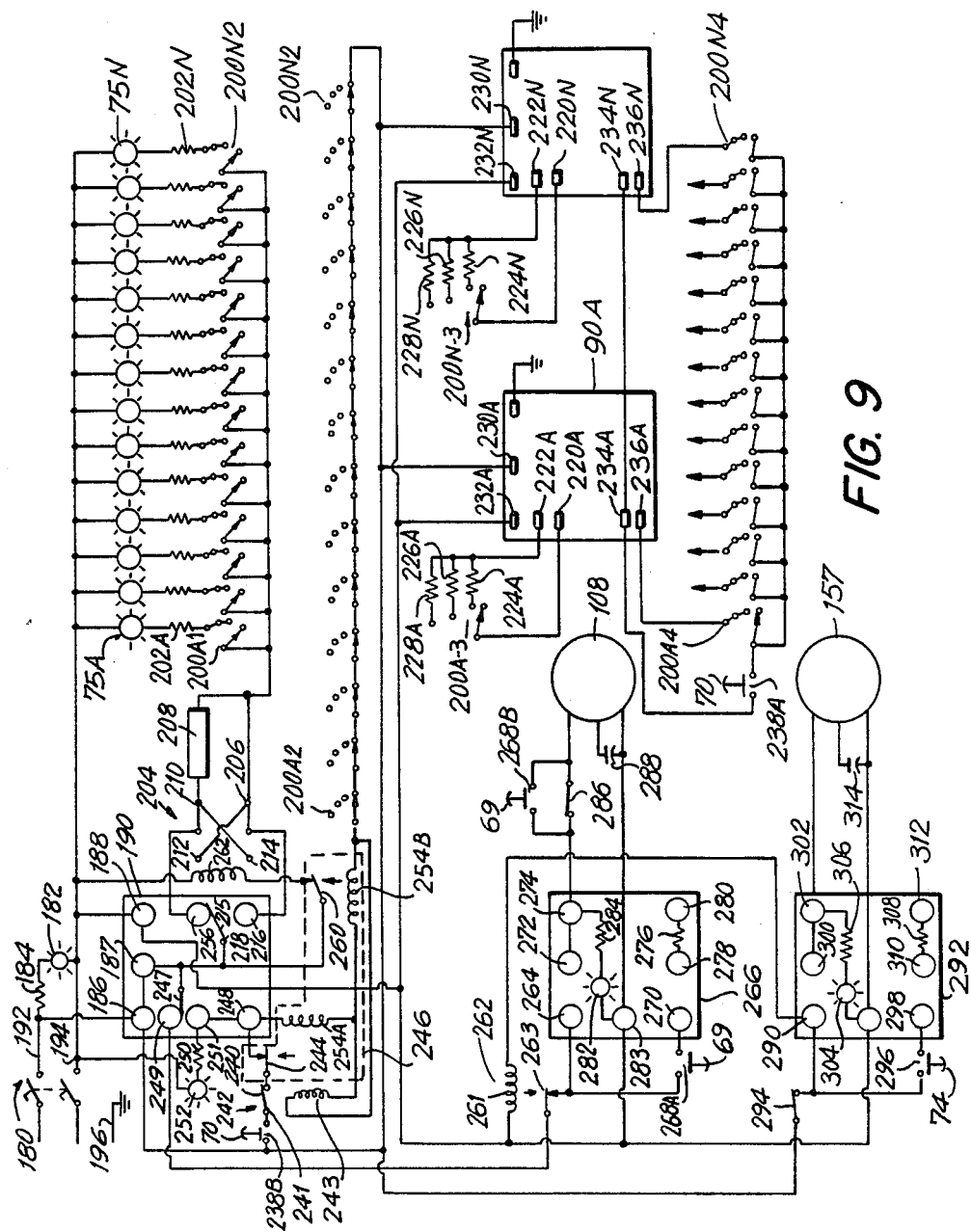
FIG. 9 is an electrical schematic diagram showing the control circuits of the cosmetic dispensing system.

Referring now to FIG. 9, the electrical control circuit of the invention is now described When power is supplied to apparatus 11 by depressing translucent power button 10 (FIG. 1), power switch 180 is closed and a light 182 located behind button 10 is illuminated by current conducted through dropping resistor 184. Power is then also supplied to terminals 186 and 188 of a dispensing timer 190 such as a model ERD1-426 manufactured by Solid State Activated Controls, Inc. of Baldwinsville, N.Y. For ease of explanation, the power lead connected to terminal 186 will be referred to as line 192 while the line connected to terminal 188 will be referred to as line 194 It will be understood that in accordance with standard electrical wiring codes line 192 is connected, through switch 180, to the white (high) power lead while line 194 is connected to the black (low) power lead of a standard 120 volt A.C. power line. It will be understood that this relationship will be maintained if a polarized plug or preferably a standard 3 wire A.C. plug is used having provisions for a ground wire 196 for grounding the chassis of apparatus 11.

The operation of the circuit of FIG. 9 for dispensing is now described. Each measuring knob 73 (FIG. 1) operates one respective dispensing switch 200A to 200N Each dispensing switch 200A to 200N has four poles The poles are represented in FIG. 9 as a suffix after the switch designation. For example, with respect to switch 200A, pole 1 is designated 200A-1, pole 2 is designated 200A-2, pole 3 is designated 200A-3, while pole 4 is designated 200A-4.

Each switch 200A to 200N has four positions 0, 1, 2, and 3 corresponding to the positions of measuring knobs 73 as described above.

The first pole of each of switches 200A to 200N is used for control of display lights 75. Specifically, one side of each of lights 75A to 75N is connected to line 194. The other side of each of lights 75A to 75N is connected to one side of a respective resistor 202A to 202N. The other end of each of resistors 202A to 202N is connected to the terminals of one respective pole 200A-1 to 200N-1 corresponding to the 1, 2, and 3 positions of switches 200A to 200N.

The wipers of each of one of poles 200A-1 to 200N-1 are all connected in parallel to a first normally closed contact 206 of a first pole of a relay designated generally as 204. The wipers of poles 200A-1 to 200N-1 are also connected to one terminal of a flasher unit 208 such as an FS127 manufactured by Solid State Activated Controls, Inc. Flasher unit 208 may be a solid state flasher or may be one of the earlier types which contain a bi-metallic strip which bends to periodically terrupt current traveling therethrough. Its function is described in more detail below. The other terminal of flasher unit 208 is connected to a second normally closed contact 210 of a second pole of relay 204.

Terminal 206 of relay 204 is cross wired to a normally open contact 212 associated with the second pole of relay 204. Normally closed contact 210 is cross wired to normally open contact 214 associated with the first pole of relay 204. Terminal 216 is electrically connected to terminal 187 and to terminal 186 (and therefore line 192) through a first pole 215 of a double pole double throw relay disposed within timer 190. The operation of a second pole 247 is described below.

Poles 200A-2 to 200N-2 of switches 200A to 200N are connected in series so that when all of said switches are in the O position, power is supplied to a reset coil 254B of a relay 246. Relay 246 is a latching relay such as type KUL 11A158-120 manufactured by Potter-Brumfield of Princeton, Ind. Relay 246 includes a set coil 254A, and two sets of contacts 260 and 244. One side of coil 254B is connected to terminal 256 of timer 190, and therefore to line 194. The other side of reset coil 254B is connected to pole 200A-2 of switch 200A. Pole 200N-2 of switch 200N is connected to terminal 186 of timer 190, and therefore to line 192. The application of power by closing switch 180 thus resets relay 246 (switches 200A to 200N in the 0 position) if is has not already been reset. This causes contacts 260 to close, thus energizing coil 262 of relay 204 and switching relay 204 into the configuration not represented in FIG. 9. When any one of knobs 73A to 73N is rotated to turn respective switch 200A to 200N to any of the 1, 2 or 3 positions, a corresponding display light 75A to 75N will be illuminated indicating that corresponding ingredients in respective bottles 27 will be dispensed. Since internal relay pole 215 of timer 190 connects terminal 218 to terminal 256 of timer 190, and coil 262 of relay 204 is activated, power by-passes flasher unit 208, and display lights 75A to 75N corresponding to selected ingredients remain lit continuously during ingredient selection.

Poles 200A-3 to 200N-3 of switches 200A to 200N are used to control the length of the interval of time during which motors 90 of pumps 89 operate to dispense additives. Specifically, motors 90A to 90N (only 90A and 90N are represented in FIG. 9) all operate at the same speed. However, the length of time for which they operate when actuated, as set forth below, is determined by the position of respective switches 200A to 200N. In the 0 position, each of poles 200A-3 to 200N-3 does not complete a circuit between a respective terminal 220A to 220N and a respective terminal 222A to 222N of each of motors 90A to 90N. In the 1 position one of resistors 224A to 224N completes the circuit. In the 2 position, one of resistors 226A to 226N completes the circuit. In the 3 position, one of resistors 228A to 228N serves this function. Thus, a resistor takes the place of a speed control potentiometer on each motor control unit of each motor 90A to 90N on pumps 89. In practice the speed control potentimeter is removed, and leads to the circuitry of FIG. 9 are provided, instead.

Resistor 228A to 228N are selected to cause motors 90A to 90N to operate for a relatively long period of time, thus dispensing a larger selected measure of the respective ingredients. Resistors 226A to 226N cause motors 90A to 90N to operate for a shorter period of time thus dispensing a smaller quantity of a selected ingredient. Resistors 224A to 224N cause motors 90A to 90N to operate for a shortest period of time, thus dispensing a smallest quantity of a selected ingredient. Power is supplied to the motor control units of each of motors 90A to 90N by the connection of line 192 to each of terminals 230A to 230N and the connection of line 194 to each of terminals 232A to 232N (as long as power switch 180 is closed).

Motors 90A to 90N are started when a respective terminal 234A to 234N is momentarily electrically connected to a respective terminal 236A to 236N thereof. Thus, terminals 234A to 234N are all connected in parallel to a first terminal of ½ of a dispense switch denoted as 238A activated by operation of dispense button 70 (FIG. 1). The other terminal of the first half of dispense switch 238A is connected to the slider of each one of poles 200A-4 to 200N-4 of switches 200A to 200N. The 0 position contacts of each of poles 200A-4 to 200N-4 are not utilized. However, the contacts associated with the 1, 2 and 3 positions of each of poles 200A-4 to 200N-4 are connected together and to respective terminals 236A to 236N of motors 90A to 90N. Thus, when an ingredient has been selected by turning one of selector knobs 73 to any position other than 0, depressing dispense button 70 closes switch 238A and activates those of motor 90A to 90N corresponding to the selected ingredients. Each of motors 90A to 90N then runs for a time determined by the selected position as described above.

Depressing dispense button 70 also closes the other half of the dispense switch, denoted as 238B, one side of which is connected to line 192. The other side of switch 238B is connected to a first normally closed contact of a first pole 241, of a relay 242. The side of this pole of relay 242 not connected to switch 238B is connected to the contacts of pole 244 of relay 246. When switch 238B is closed as a result of pressing dispense button 70, power from line 192 is momentarily fed to terminal 248 of timer 190 causing the activation thereof, which causes first relay pole 215 and second relay pole 247 within timer 190 to change state. Power from line 192 is disconnected from a terminal 249 of timer 190 and connected to a terminal 251 instead for a period of time determined by the time-out interval of timer 190. This causes current to pass through resistor 250 to illuminate lamp 252 behind translucent button 70, since the side of lamp 252 not connected to resistor 250 is connected to line 194. Power is also connected to relay coil 254A of relay 246A thus setting (latching) relay 246 and opening contacts 244. Until all of the dispensing switches 200A to 200N are returned to the 0 position, relay 246 remains latched with contacts 244 open. This prevents a second dispensing cycle from being started, after a first cycle has started.

When switches 238A and 238B being simultaneously closed and power is applied to terminal 248 of timer 190, a dispensing cycle is started. Terminals 216 and 218 of timer 190 are electrically connected for the time-out interval of timer 190. This time is selected to be longer than the longest dispensing time required by motors 90A to 90N. In other words, even when switches 200A to 200N are in the 4 position and resistors 228A to 228N define the longest period of time for motors 90A to 90N to run, the run time has elapsed before timer 190 causes pole 215 to disconnect terminal 218 from terminal 216 and connect terminal 218 instead to terminal 256 of timer 190.

During the dispensing cycle, coil 262 of relay 204 is deenergized, and with power supplied to terminal 216 of timer 190, power is supplied to selected display lights 75A to 75N without passing through flasher unit 208. When the dispensing cycle is complete, and power is supplied to terminal 256, power is supplied to display lights 75A to 75N through flasher unit 208. The connection of even a single light is sufficient to cause flasher 208 to periodically interrupt the current to the lights thus causing the selected light or lights to flash on and off. This flashing may be terminated only by resetting all of switches 200A to 200N to the 0 position. When this is done, power from line 192 travels through series connected poles 200A-2 to 200N-2 thus activating reset coil 254B of relay 246. Contacts 244 and 260 of relay 246 are closed and all display lights 75A to 75N are extinguished. Coil 243 of relay 242 is also activated opening the contacts of pole 241. This prevents the application of power to terminal 248 of timer 190 and prevents a dispense cycle from being started unless at least one of switches 200A to 200N is rotated out of the 0 position.

When the dispensing cycle has been completed, pole 247 of timer 190 returns to the position shown and power is returned to terminal 249 of timer 190. Current then may pass through the normally closed contacts 263 of a relay 262 (having a coil 261) to a terminal 264 of a turntable timer 266. Pressing rotate button 69 closes a switch 268A which supplies power to a terminal 270 of turntable timer 266. This in turn causes power to be supplied to terminals 272 and 274 for a period of time determined by the value of a resistor 276 which is electrically connected between terminals 278 and 280 of timer 266. The application of power to terminal 274 causes a dispense light 282 located behind rotate button 69 (which is translucent) to illuminate due to current conducted through a resistor 284 and light 282, the other side at which is connected to line 194.

Pressing rotate button 69 also momentarily closes switch 268B which is in parallel with the normally closed contacts 286 of microswitch 179. However, when power is first applied to timer 266, contacts 286 will generally be open due to the engagement of one of screws 104 with the plunger of microswitch 179. Thus, it is necessary for contacts 268B to close momentarily in order that terminal 274 of timer 266 be electrically connected to one side of turntable motor 108. The other side of turntable motor 108 is connected to terminal 283 of timer 266 and therefore to line 194. A starting capacitor 288 is also connected to motor 108.

Timer 266 maintains power to turntable motor 108 for a time longer than that required for rotation through 90°. However, when turntable 49 has rotated 90° the next screw 104 contacts the plunger of microswitch 179 opening contacts 286 thereof and terminating operation of turntable motor 108. Shortly thereafter, time-out of timer 266 occurs and the rotate cycle is complete.

It will be understood that rotation of turntable 49 cannot take place during dispensing of additives because power is removed from terminal 249 of timer 190 during the dispensing cycle. Further, as will become apparent from the description below, rotation of turntable 49 my not take place during blending.

Terminal 186 of timer 190, and therefore line 192, is connected to a terminal 290 of a blending timer 292 through the normally open contacts 294 of an additional microswitch (not shown before). The mechanical arrangements are such that the contacts of microswitch 294 are closed when mounting block 59 rests on lip 72 and mixing rod 55 is positioned within jar 53. The application of power to terminal 290 of blending timer 292 activates coil 261 of relay 262 thus opening normally closed contacts 263 of relay 262 and preventing operation of turntable motor 108. Thus, the circuit of FIG. 9 also provides an interlock so that turntable 49 cannot be rotated when a mixing rod 55 is positioned within jar 53.

After power has been applied to terminal 290, if blend button 74 is pressed, the contacts of a switch 296 are closed providing power to terminal 298 of blending timer 292. Power is then applied to terminals 300 and 302 of timer 292. A dispense light 304 located behind blend button 74, which is translucent, is illuminated by current conducted through a resistor 306. The side of light 304 not connected to resistor 306 is returned to terminal 188 of timer 190 and therefore to line 194. A resistor 308 electrically connected between terminals 310 and 312, determines the time-out interval for blending timer 292. During this interval power is supplied to blend motor 157 thus causing blending of the cosmetic additives into the cosmetic base contained in jar 53. A start capacitor 314 for motor 157 is provided.

Times 266 and 292 may be those manufactured by Artisan, Inc. of Parsipany, N.J. and sold as Part No. 4310A-8-120AC-5A. Further, relays 204, 242 and 262 may be those manufactured by Magnacraft of Northbrook, Ill. as Part No. W78ARCSX-11.

It will be appreciated that the circuit of FIG. 9 is interlocked so that dispensing or blending precludes the rotation of turntable 49. Further, if rotation of turntable 49 is occurring, dispensing and blending are both precluded. However, it is possible to dispense and to blend at the same time, which is a significant time saving feature.

The cosmetic dispensing system described herein is suitable for preparing a particular cosmetic product from a cosmetic base and a variety of additives. Typically, the base constitutes between 98-99% of the product, and the additives between 1-2% of the product.

The cosmetic dispensing system described herein is particularly advantageous since the bottles which contain the cosmetic additives and their corresponding tubings are easily removed and replaced. As a result, contamination may be avoided when the operator wishes to utilize a different group of additives in order to prepare the cosmetic product.

It is also to be understood that the following claims are intended to cover all of the generic and specific features of the invention herein described, and all statements of the scope of the invention which, as a matter of language, might be said to fall therebetween.

We claim:

1. A cosmetic dispensing system for blending selected cosmetic additives into a cosmetic base comprising:
   a plurality of storage means, each of the storage means being for storage of one of said additives;
   means for containing said base at a first position in said system;

means for transferring each of said additives from each of said storage means to said containing means;

means for selecting at least one of said additives for transfer by said transferring means; said selecting means comprising a plurality of switches for permitting actuation of said transferring means; and means for mixing said base after transfer of at least one of said additives to said container.

2. The cosmetic dispensing system of claim 1, further including means for measuring a desired amount of selected additives for transfer by said transferring means.

3. The cosmetic dispensing system of claim 2, further including means for moving said containing means from said first position to a second position, the mixing of said base with said additives occurring at said second position.

4. The cosmetic dispensing system of claim 3, wherein said plurality of storage means comprise a plurality of bottles.

5. The cosmetic dispensing system of claim 4, wherein each of said bottles comprise a container, a neck and a lid suitable for being tightened about said neck.

6. The cosmetic dispensing system of claim 3, wherein said transferring means comprises:

means for carrying each of said additives from each of said storage means to said containing means; and means for urging each of said additives from said storage means to said containing means.

7. The cosmetic dispensing system of claim 6, wherein said carrying means comprises a plurality of tubes corresponding to said plurality of storage means, each of said tubes having a first end and a second end, wherein said first end of each said tubes communicates with said corresponding storage means.

8. The cosmetic dispensing system of claim 7, wherein said second ends of said tube are bundled together.

9. The cosmetic dispensing system of claim 7, wherein the second ends of said tubes are situated over said containing means when said containing means is in said first position.

10. The cosmetic dispensing system of claim 7, wherein said urging means comprises a plurality of pumps corresponding to said plurality of tubes.

11. The cosmetic dispensing system of claim 10, wherein said pumps comprise peristaltic pumps which contact only exterior surfaces of said tubes.

12. The cosmetic dispensing system of claim 3, wherein said moving means comprises a turntable and means for rotating said turntable.

13. The cosmetic dispensing system of claim 12, wherein said rotating means comprises:

a shaft axially mounted through said turntable; and motor means for turning said shaft.

14. The cosmetic dispensing system of claim 3, wherein said stirring means comprises means for rotating said containing means after said containing means is moved to said second position.

15. The cosmetic dispensing system of claim 14, wherein said rotating means comprises:

means for retaining said container at said second position; and means for rotating said retaining means.

16. The cosmetic dispensing system of claim 15, wherein said retainer rotating means comprises a shaft mounted axially to said retaining means and means for turning said shaft.

17. The cosmetic dispensing system of claim 16, wherein said shaft turning means comprises a drive mechanism and motor means for activating said drive mechanism.

18. The cosmetic dispensing system of claim 17, wherein said drive mechanism comprises a knurled wheel retained about said shaft, a drive wheel suitable for engaging said knurled wheel, and a second shaft axially mounted through said drive wheel and coupled to said motor means.

19. The cosmetic dispensing system of claim 14, said mixing means further comprises means for stirring said base and said transferred additives contained in said containing means when said containing means is rotated.

20. The cosmetic dispensing system of claim 19, wherein said stirring means comprises a base, height adjustment means for vertically adjusting the height of said base in said system, an arm having a proximate end and a remote end, said arm connected to said base at said proximate end so as to extend longitudinally therefrom, and a stirring rod fixed to the remote end of said arm and suitable for being inserted within said containing means.

21. The cosmetic dispensing system of claim 20, wherein said base is horizontally rotatably from a first position, in which said rod is above said containing means, to a second position, in which said rod is not above said containing means.

22. The cosmetic dispensing system of claim 20, wherein said arm is telescopingly received in said base for enabling adjustment of distance of said stirring rod from said base.

23. The cosmetic dispensing system of claim 20, further including a vertically extending channel and a rod slideable within said channel, said base radially extending from said rod.

24. The cosmetic dispensing system of claim 1, wherein said transferring means comprises:

a plurality of tubes corresponding to said plurality of storage means; each of said tubes having a first end which communicates with said corresponding storage means and a second end for dispensing a selected additive to said containing means; and a plurality of pumps, each of said pumps corresponding to one of said plurality of tubes.

25. The cosmetic dispensing system of claim 24, wherein said selecting means comprises a plurality of switches, each of said switches being operative to permit actuation of one of said pumps.

26. The cosmetic dispensing system of claim 25, wherein each of said switches has a plurality of successive transfer positions for permitting actuation of a respective one of said pumps, each of said transfer positions being for actuating said pumps to dispense a different quantity of its corresponding additive.

27. The cosmetic dispensing system of claim 26, further comprising a transfer measuring means associated with each of the transfer positions of each of said switches.

28. The cosmetic dispensing system of claim 27, wherein each of said transfer measuring means is a resistor.

29. The cosmetic dispensing system of claim 27, wherein each of said transfer measuring means determines the length of time of operation of a corresponding one of said pumps.

30. The cosmetic dispensing system of claim 29, further comprising timer means for supplying power to said pumps, said power being supplied to said pumps for a time period longer than a longest period of operation of said pumps as defined by said transfer measuring means.

31. The cosmetic dispensing system of claim 25, wherein each of said switches has an inhibit position wherein transfer of a corresponding additive by said pump is inhibited.

32. The cosmetic dispensing system of claim 31, further comprising:
a first interlock means for preventing operation of said pumps after said pumps have operated to transfer selected additives to said containing means, and
a reset means for resetting said interlock means to permit operation of said pumps, said reset means being caused to operate by setting all of said switches to said inhibit position.

33. The cosmetic dispensing system of claim 24, further comprising:
a first interlock means for preventing operation of said pumps after said pumps have operated to transfer selected additives to said containing means; and
a reset means for resetting said first interlock means.

34. The cosmetic dispensing system of claim 33, further comprising:
means for moving said containing means from said first position to a second position, the mixing of said base with said additives occurring at said second position; and
a second interlock means for preventing operation of said moving means during operation of said transfer means.

35. The cosmetic dispensing system of claim 34, further comprising:
a third interlock means for preventing operation of said moving means during operation of said mixing means.

36. The cosmetic dispensing system of claim 1, wherein said mixing means comprises means for rotating said containing means.

37. A method for preparing a cosmetic product comprising:
selecting at least one of a number of cosmetic additives stored in plurality of storage means;
transferring said at least one of said selected additives from said plurality of storage means to a containing means which contains a cosmetic base by activating a selected number of switches corresponding to said selected additives; and
mixing said base with said at least one of said additives in said containing means.

38. The method of claim 37, further including the step of measuring a desired amount of said selected additives prior to said transfer step.

39. The method of claim 38, further including the step of moving said containing means after said transferring step from a first position to a second position prior to said mixing step.

40. The method of claim 39, wherein said transferring step comprises dispensing, by means of a pump system, said selective additive through a plurality of tubes corresponding to a plurality of storage means.

41. The method of claim 40, wherein said moving step comprises rotating a turntable which supports said containing means.

42. The method of claim 41, wherein said mixing step comprises rotating said containing means when said containing means is in said second position.

43. The method of claim 42, wherein said mixing step further includes, inserting a mixing rod in said containing means, said mixing rod being in said containing means while said containing means rotates.

44. A cosmetic dispensing system for preparing a cosmetic product comprising:
a plurality of storage means, each of said storage means for storing selected cosmetic additives;
means for containing a base;
means for transferring each of said additives from each of said storage means to said containing means; and
means for selecting at least one of said additives for transfer by said transferring means, said selecting means comprising a plurality of switches for permitting activation of said transfer means.

45. A cosmetic dispensing system for blending selected cosmetic additives into a cosmetic base comprising:
a plurality of storage means, each of the storage means for storing one of said additives;
means for containing said base at a first position in said system;
means for transferring each of said additives from each of said storage means to said containing means;
means for selecting at least one of said additives for transfer by said transferring means;
means for moving said containing means from said first position to said second position;
means for mixing said base at said second position after transfer of at least one of said additives to said container.

46. A cosmetic dispensing system for blending selected cosmetic additives into a cosmetic base comprising:
a plurality of storage means for storing individually one of said additives;
means for containing said base;
means for transferring each of said additives from each of said storage means to said containing means, said transferring means comprising a plurality of tubes corresponding to said plurality of storage means, each of said tubes having a first end which communicates with said corresponding storage means and a second end for dispensing a selected additive to said containing means, and a plurality of pumps, each of said pumps corresponding to one of said plurality of tubes;
means for selecting at least one of said additives for transfer by said transferring means, said selecting means comprising a plurality of switches, each of said switches being operative to permit actuation of one of said pumps; and
means for mixing said base after transfer of at least one of said additives to said container.

47. A cosmetic distribution system for providing a customized cosmetic product at a retail location comprising:
a plurality of containers, each having a standardized base therein, and shipped from a manufacturer to said retail locations; and an automated cosmetic additive dispensing machine at each of said retail locations, each of said machines being suitable for blending cosmetic additives into the base of a container, said machine including:

a plurality of storage means, each of the storage means storing a respective additive;

means for transferring each of said additives from its respective storage means to one of said containers located relative to the machine; and means for selecting at least one of said additives for transfer by said transferring means to said container.

48. The cosmetic distribution system of claim 47, wherein said machine further includes means for mixing the base in said located container after transfer of at least one of said additives to said container.

49. The cosmetic distribution system of claim 47, wherein the base in each of said containers constitutes substantially most of said cosmetic product.

50. The cosmetic distribution system of claim 47, wherein said transferring means includes means for metering out said at least one of a number of cosmetic additives in a sufficiently precise manner to enable customization of said cosmetic product.

51. A method for preparing a cosmetic product at retail locations comprising:

shipping a plurality of containers, all of which have standardized base therein, from a manufacturer to said retail locations; and blending cosmetic additives into the base of one of said containers at said retail location using an automated cosmetic additive dispensing machine, said blending step including the steps of (a) selecting at least one of a number of cosmetic additives stored in a plurality of storage means in said machine;

(b) transferring said at least one of said selected additives from said plurality of storage means to said container located relative to the machine; and (c) mixing the base in said located container after transfer of said at least one of said additives to said container.

52. The method of claim 51, wherein said transferring step comprises metering out said at least one of a number of cosmetic additives in a sufficiently precise manner to enable customization of said cosmetic product.

53. The method of claim 51, wherein the amount of the base shipped in each container constitutes substantially most of said cosmetic product.

* * * * *